United States Patent Office 2,768,149
Patented Oct. 23, 1956

2,768,149

ALKYD-MODIFIED SILOXANE COATING COMPOSITION

Ronald L. Millar, Chicago, Ill., assignor to The Glidden Company, Cleveland, Ohio, a corporation of Ohio No Drawing. Application November 12, 1952,
Serial No. 320,120

7 Claims. (Cl. 260—33.6)

This invention relates to improved synthetic silicone resin coating compositions, and relates particularly to varnishes and enamels prepared from alkoxy-polysiloxane compositions cobodied with evanescent monocarboxylic-acid-modified alkyd compositions.

White enamel paints (as distinguished from vitreous enamels) which are highly resistant to discoloration, loss of gloss and other defects when subjected for prolonged periods of time to moderately elevated temperatures have long been sought. A few types prepared from synthetic resins have been found to exhibit moderate heat resistance, but as far as I am aware the best of such known products will endure only a few hours at temperatures of 500° F. without becoming noticeably discolored and without showing obvious signs of deterioration of the film, such as checking and loss of gloss. Polysiloxane coatings have been proposed for use as temperature-resistant vehicles, but such coatings become thermoplastic at elevated temperatures. Prior art attempts to modify such polysiloxane compositions with other types of organic film-forming materials, to overcome the thermoplastic characteristics of the polysiloxanes, have usually resulted in lowering the temperature resistance. I have now found, however, that suitably selected monocarboxylic-acid-modified alkyd resins can be cobodied with selected alkoxy-polysiloxanes to produce remarkably heat-resistant varnishes and enamels. Some of the white enamels prepared in accordance with the present invention (e. g., Example 18) have been found to remain undiscolored, glossy, hard and free of other defects after prolonged heating on the order of 100 hours at 500° F. I am aware of the British specification No. 583,754 of Bowman and Evans (December 30, 1946), relating to alkyd-modified polysiloxane compositions, and it will be apparent from the following description of my invention that my compositions provide a notable advance therefrom. I am also acquainted with the as yet unsealed but open-to-inspection British application No. 29,237 of the Thomson-Houston Company and the Doyle and Nelson U. S. Patent No. 2,587,295 in which fatty-acid-modified alkyds having free hydroxyls are heat reacted with silicon-bonded alkoxy-containing compositions, but it will be apparent that my coating compositions are specifically different in constitution of the alkyd modifiers. The Goodwin and Hunter U. S. Patents Nos. 2,584,342, 2,584,343 and 2,584,344 and 2,589,243 are of general interest also.

It is an object of my invention to provide an improved alkyd modified alkoxy-polysiloxane coating composition.

It is a further object to provide a modified alkoxy-polysiloxane coating composition which after being baked and heated at high temperatures ultimately provides a film which is composed essentially of silicones and which remains hard and glossy for long periods of time at temperatures as high as 500° F.

It is another object to provide a modified alkoxy-polysiloxane coating composition which remains undiscolored for long periods of time at temperatures as high as 500° F.

It is another object to provide a coating composition from selected alkoxy-polysiloxanes which have been cobodied with monocarboxylic-acid-modified alkyd resins and which cobodied composition is heat-stable against discoloration resulting from thermal cracking or thermal decomposition.

These and other objects will be apparent from the following description of the invention.

As mentioned above, the unmodified polysiloxane resins which have been proposed in the past for use as heat-resistant films have been found to exhibit various shortcomings. They become soft and thermoplastic at elevated temperatures, have low adhesion characteristics, poor abrasion resistance, and inferior solvent resistance. Moreover, they are presently high in cost. Attempts have been made to modify polysiloxane resins with other organic film-forming materials, but it has been found that the modifying materials heretofore used have not been especially satisfactory. They induce discoloration in the film at high temperatures and induce film deterioration marked by checking or cracking, loss of gloss, etc. I have now found, however, that these disadvantages can be overcome by cobodying alkoxy-polysiloxanes with monocarboxylic-acid-modified alkyds of selected ingredients and proportions. The resulting coating compositions are of moderate cost and are remarkably heat-stable in that they remain hard and undiscolored, and exhibit good adhesion, good abrasion resistance, good solvent resistance, and good durability. The coating films so provided are characterized by the evanescent nature of the alkyd, and by their ultimate conversion to nearly alkyd-free silicone films.

The alkyds used in my present invention, like that of my copending application Ser. No. 113,675, filed September 1, 1949, are characterized by their ability, when cobodied with alkoxy-polysiloxanes, to resist decomposition at elevated temperatures into colored products. The products of decomposition of the alkyd and/or silicone are volatile and do not char. I have found that in order to secure this characteristic, the alkyd and the alkoxy-polysiloxane must be formulated from carefully selected materials, and must be suitably proportioned. The type of alkyd which I employ is described in the West and Enterline U. S. Patent No. 2,437,657, but for best results I have found that the following limitations should be observed. I prefer to use phthalic anhydric or phthalic acid as the polybasic acid. Other polybasic acids or acid anhydrides which are mentioned in the West and Enterline patent, and which boil or sublime above about 200° C., may be used, provided they are highly purified, or are synthetic acids. The polyhydric alcohols may be any of the di- to tetrahydric aliphatic or cyclic saturated alcohols or epoxy potential-alcohol compounds. For example, glycerol, pentaerythritol, trimethylol propane and trimethylol ethane are suitable. I especially prefer chemically-pure water white glycerine for best heat-stability. Small amounts of glycols may be used, but their volatility makes them less desirable. The monocarboxylic acids used to modify the alkyd must be saturated, non-drying branched or straight chain aliphatic acids, preferably of between 6 and 10 carbons, inclusive, or aryl or aralkyl monocarboxylic acids having up to 11 carbon atoms, and they must be purified sufficiently to ensure the absence of non-benzenoid unsaturation. They need not be pure compounds within the limits stated, since mixtures of the specified acids may be employed. However, acids derived from natural sources are not presently as satisfactory as the synthetic acids, and I prefer the latter. Typical monocarboxylic acids which presently are available as synthetic materials are 2-ethyl hexoic, nonanoic, tertiary butyl benzoic, and benzoic, and these acids may be used individually or in admixture. The total quantity of monocarboxylic acid should be such that its weight plus its chemical equivalent weight of polyhydric alcohol is between about 35% and 50% of the total weight of esters calculated thus: weight of monocarboxylic acid plus its chemical equivalent of polyhydric alcohol plus weight of polybasic acid plus its chemical equivalent of polyhydric alcohol. Thus the monocarboxylic acid ester is from about ⅓ to ½ of the total weight of theoretical esters in the alkyd. The ingredients of the alkyd should be proportioned so as to produce a product having a low acid number such as an acid number below about 50 on a solvent-free basis. Since it is necessary for the alkyd to contain residual hydroxy groups, it is obvious that the polyhydric alcohol should be in excess of the equivalent amount required to react with the acidic portion of the alkyd, so that the excess may react with at least a major part of the RO—groups of the siloxane. Various amounts of excess polyhydric alcohol may be used from OH/RO— ratios somewhat less than 1:1 to ratios considerably in excess of 1:1. It is preferred, however, that the excess hydroxyl be about equal to the alkoxy content of the alkoxy polysiloxane, or sufficiently great to react with all of the RO—groups of the polysiloxane.

The monocarboxylic-acid-modified alkyds described above may be cobodied with selected alkoxy-polysiloxanes in proportions such that the alkyd amounts to between about 90% and 25%, and the alkoxy-polysiloxanes amount to about 10% to 75%, by weight. I particularly prefer to use between 20% and 60% of the alkoxy-polysiloxanes.

The type or kind of alkoxy organopolysiloxane employed in the practice of this invention may be varied over a wide range of compositions. Any of the well known intermediates described in the aforementioned Goodwin and Hunter patents may be used. The following are examples of the RO— groups contemplated: methoxy, ethoxy, propoxy, isopropoxy, butoxy, etc., or admixtures thereof. It should be noted that the RO— groups preferable for the practice of this invention are primary and secondary saturated alkoxy groups, but the cycloalkoxy groups such as cyclopentoxy and cyclohexoxy may also be used alone or in combination with each other and/or with the above groups. It is advisable to limit the polysiloxanes employed to those whose alcohol corresponding to any RO— group thereof has a boiling point of less than 175° C. although at times a somewhat higher boiling range may be tolerated.

Alkoxy siloxanes suitable for the present invention, some of which are presently available commercially, are hydrolysis and/or alcoholysis products of compositions which have the average general formula $R'_n SiX_{4-n}$, wherein $R'$ represents phenyl and methyl radicals and X represents halogen, and where $n$ has a value of between 1 and 1.7. Between 10 and 90 percent of the organic radicals represented by $R'$ are phenyl radicals, and the remainder are methyl radicals. A mixture of silanes which has the average composition stated may be prepared from a plurality of silanes of the following types: silicon tetrachloride, phenyltrichlorosilane, methyltrichlorosilane, diphenyldichlorosilane, phenylmethyldichlorosilane, dimethyldichlorosilane, triphenylchlorosilane, diphenylmethylchlorosilane, phenyldimethylchlorosilane, trimethylchlorosilane. These monomers are employed in such relative proportion as to yield a mixture having the stated average composition and having the phenyl and methyl radicals within the stated relative range.

Such a mixture may be alcoholized and hydrolyzed simultaneously or alcoholized and then hydrolyzed or merely alcoholized. The alcoholysis may be carried out by reacting the mixed silanes with an amount of any suitable alcohol at least stoichiometrically equivalent to that needed for converting all halogens to alkoxy groups. If hydrolysis and alcoholysis is contemplated, only sufficient water should be used to give the desired number of siloxane linkages.

I have found that the number of alkoxy radicals per silicon atom can vary widely depending on the properties desired in the final product. Average ratios of from about 0.01 to 2 have been used but I prefer between 0.1 and 1.0. Thus the average molecular weight of the alkoxy siloxane intermediate may be relatively low as for example, triphenyldimethyltrimethoxytrisiloxane, methyltriphenyldiethoxydisiloxane, trimethylphenyldiisopropoxydisiloxane, etc.

The process of the invention involves cobodying with heat the alkoxy siloxane(s) with the alkyd(s) and may be conducted either in the presence or absence of an inert solvent. I prefer, however, to heat the reactants in the presence of a water insoluble solvent such as toluene, xylene, methyl isobutyl ketone, etc. In cases where no solvent is used the ingredients are heated in a suitable vessel allowing the alcohol of reaction to distill off until the mass is brought to a point just short of gellation. In the preferable process where an inert solvent is used, the ingredients are heated in a vessel fitted with a device for fractionally separating the alcohol from the inert solvent and returning the latter to the sphere of the reaction. Such a device may be a fractional distilling column or, where water-soluble alcohols are generated, it may be one in which the distillate is scrubbed with water before returning to the reaction vessel. It is, of course, not imperative to the preferred method that all or any of the inert solvent be returned to the reaction vessel. Water of reaction from an incompletely condensed alkyd may also be collected.

The cobodied mass may be thinned with additional solvent and applied as a coating composition with or without the addition of pigments. Various pigments may be added to the varnish to prepare enamels. For white enamels I prefer to use anatase titanium dioxide, but rutile titanium dioxide is also satisfactory. Cadmium colors (yellow, orange, red, etc.), phthalocyanine blue, carbon black, aluminum pigment and DuPont's fast violet are examples of different chemically-inert color pigments which are suitable. Usual extender pigments may be used also; e. g., barium sulfate, mica, asbestine, etc.

Enamels made from the cobodied varnish exhibit good heat resistance, discolor almost imperceptibly, if at all, when heated for as long as 100 hours at 400° F. (or 100 hours at 500° F. in some embodiments) have good adhesion, good water, moisture, alkali and organic solvent resistance, have good electrical properties, and are not thermoplastic after being baked. This lack of thermoplasticity is a curious and outstanding characteristic of the cobodied coatings of my invention. The alkyd component of the composition, when applied as a coating by itself, is highly thermoplastic at the baking temperatures of 450° F. or 500° F. Likewise, the alkoxy-polysiloxane compositions when cured alone at such temperatures are also thermoplastic. Yet the cobodied compositions prepared from those alkyd and alkoxypolysiloxane components produce a hard, non-thermoplastic film at the stated baking temperatures. Moreover, the film does not become thermoplastic in the course of time at such temperatures, even though the alkyd component gradually decomposes and is dissipated from the film. In the course of 100-hour tests which I have made, I have found that the alkyd component is dissipated to an extent of about 90% after 20 hours at 500° F. yet even then the remaining film composed largely of silicones remains hard and continues for additional periods several times as long to exhibit good gloss and to provide a durable, mar-resistant protective coating. The retention of gloss is another outstanding characteristic of the film, particularly when one considers that as the alkyd component is dissipated the pigment-binder ratio in the remaining film increases to well beyond the ratio at which a gloss would be obtained if only the polysiloxane binder were used.

In view of the evanescent nature of the alkyd component of my coating composition, it becomes apparent that it must originally be formulated so that no charring will occur during its thermal decomposition into volatile materials. Any such charring would, of course, cause discoloration and darkening of the film.

It will also be apparent that the alkyd component serves useful purposes. It assists materially in providing a viscosity in the coating composition which permits a wet film of the desired thickness to be applied. After the wet film has been baked, the alkyd component in combination with the siloxane component produces a hard, non-thermoplastic film. When the coated product, such as a stove, goes into service, the high service temperatures induce thermal decomposition of the alkyd, and that decomposition in turn apparently induces a reconstitution or curing of the siloxane component such that the inherent thermoplastic character of the silicone material is suppressed during all of the initial 20-hour period. At the end of that time, when the alkyd is substantially all gone, the remaining undiscolored film has been so cured that it continues to be a hard, glossy, durable film capable of withstanding high temperatures for at least an additional 80 hours. In view of these surprising observations, it becomes apparent that the presence of the alkyd component is instrumental in developing properties in the baked film and in the ensuing nearly-alkyd-free silicone film which could not have been developed if the alkoxy-polysiloxane had been applied alone.

The following examples illustrate the principles of my invention, and preferred modes of practicing the invention.

Example 1

A Pfaudler was loaded with 1146 pounds (6 mols) phenylmethyldichlorosilane and 634.5 pounds (3 mols) phenyltrichlorosilane. 504 pounds of methanol (equivalent to 75 percent of the chloride) were slowly added. Water equivalent to 35 percent of original chloride was then added in the form of a mixture of 66.2 pounds water and 66.2 pounds methanol. The reaction product was refluxed, then heated to a pot temperature of 150° C. at atmospheric pressure to distill off the volatiles. Sodium bicarbonate equivalent to 2 or 3 times the amount of acid still present was then added. The material was then reheated to 150° C. to remove methanol formed by the water of neutralization. The product was filtered to remove any solid matter present.

Example 2

A monobasic acid modified alkyd resin was prepared from the following materials:

|  | Kg. |
|---|---|
| 2-ethyl hexanoic acid | 8.56 |
| Phthalic anhydride | 10.83 |
| Glycerine | 7.88 |
| Xylene | 1.45 |

These materials were heated to reflux in a kettle equipped with a trap for removing water of reaction. After about 14 hours at temperatures of 360–434° F., an acid number of 10–11 was reached. The batch was then reduced with additional xylene to 80% nonvolatile.

Examples 3 through 7

To 473 g. of the product of Example 1 was added various amounts of water (as indicated in the table below) in the presence of 0.1% hydrogen chloride. This mixture was refluxed with stirring for a period of 8 hours. The reflux condenser was fitted with a calcium chloride tube to prevent atmospheric moisture from entering. The methanol formed during the reaction was then removed by vacuum distillation at a maximum pot temperature of 140° C. The following table shows the results of using various quantities of water for hydrolysis.

| Example | Moles Water | Percent Residual MeO[1] | Molecular [2] Weight | Viscosity (Poises)[3] |
|---|---|---|---|---|
| 1 |  | 20.34 | 374 |  |
| 3 | 0.50 | 14.22 | 631 | 1.05 |
| 4 | 0.75 | 11.19 | 739 | 1.10 |
| 5 | 1.00 | 7.52 |  | 6.40 |
| 6 | 1.25 | 5.14 | 1,014 | 165.0 |
| 7 | 1.50 | 4.11 | 1,361 | 553.0 |

[1] Determined by the modified Zeisel method in which the amount of alkyl halide formed is titrated with sodium thiosulfate.
[2] Determined cryoscopically (dissolving 5 g. of sample in 40 g. benzene and checking freezing point depression.)
[3] Determined with Brookfield viscosimeter.

Examples 8 through 13

Each of the alkoxy polysiloxanes from Examples 1 and 3 through 7 were mixed individually with the alkyd product of Example 2 in the following proportion.

|  | G. |
|---|---|
| Alkoxy polysiloxane | 52.5 |
| Alkyd resin | 225.0 |
| Xylene | 32.0 |

The mixtures were then heated in a vessel equipped with a reflux condenser and condensate trap whereby the condensate was passed through water to remove methanol before returning to the reaction vessel. The batches were cooked until they began to wrap around the stirrer and were thereafter thinned with xylene. The characteristics of the various products are shown in the following table.

| Example | Alkoxy-Polysiloxane From Example— | MeOH Collected, cc. | Acid Value | NVM | Visc. (Gardner-Holdt) | Color (Hellige) | Reaction Temp., °C. | Reaction Time, Hours |
|---|---|---|---|---|---|---|---|---|
| 8 | 1 | 6.1 | 2.6 | 62.5 | W-X | 4-5 | 153-165 | 9.5 |
| 9 | 3 | 4.2 | 1.9 | 63.6 | X-Y | 5-6 | 164-181 | 9.5 |
| 10 | 4 | 6.0 | 1.8 | 61.7 | W | 4-5 | 171-187 | 7.25 |
| 11 | 5 | 4.8 | 1.5 | 60.9 | X-Y | 4-5 | 164-195 | 18.0 |
| 12 | 6 | 3.0 | 1.8 | 62.2 | X-Y | 6-7 | 166-214 | 17.0 |
| 13 | 7 | 2.0 | 1.9 | 63.7 | Y-Z | 4-5 | 175-225 | 20.0 |

Each of these products was applied to metal panels and baked for ½ hour at 500° F. The resulting films were hard and flexible and exhibited very good color retention and film integrity when subsequently subjected to prolonged heating at 400° F.

Example 14

A monobasic acid modified alkyd resin similar to that of Example 2 was prepared from the following:

|  | G. |
|---|---|
| p-Tertiary-butylbenzoic acid | 209.4 |
| Phthalic anhydride | 216.6 |
| Pentaerythritol | 31.2 |
| Glycerine | 142.4 |
| Xylene | 90.0 |

The materials were heated to reflux in a kettle equipped with a trap for removing water of reaction. After 12 hours at reflux (temperatures of 161–184° C.) an acid number of 39.5 was obtained. At that time the batch was reduced with additional xylene to 60% non-volatile.

Example 15

508 g. of the product of Example 14 were reacted with 94.8 of the product of Example 1. The methanol of reaction was scrubbed from the condensate by passing it through water. After 4 hours an increase in viscosity was noted, and 80 g. of xylene was added. The reaction was continued until a sample reduced to 50% solids with xylene possessed a viscosity of T–U. Total reaction time 7 hours, temperature 144–157° C.

Example 16

An equimolar mixture of phenylmethyldichlorosilane, phenyltrichlorosilane and methyltrichlorosilane containing 3 gram mols of each, was added to a mixture of 270 grams (15 mols) of water, a volume of isopropanol equal to the volume of water, and 1850 grams of xylene (calculated to give a 35 percent resin solids solution). The addition was made over a 2½ hour period at temperatures ranging from 22° to 50° C. The reaction product was washed until acid free and then volatiles removed up to a pot temperature of 140° C. at atmospheric pressure. A yield of 1585 grams of 59 percent solids material was obtained. The siloxane contained from 1.52 to 1.59 percent isopropoxy by weight based on the weight of the siloxane.

Example 17

52.5 g. of the product of Example 16 was mixed with 257 g. of the product of Example 2 and heated in a vessel equipped with a reflux condenser and a device for scrubbing the isopropyl alcohol from the distillate. Heating was continued for 24 hours at 156–164° C. at which time the viscosity (Gardner-Holdt) was $Z_3$–$Z_4$. The material was cooled, applied to a metal panel and baked for ½ hour at 500° F. The resultant film was hard, clear and flexible.

Example 18

73 g. of the product of Example 4 was heated with 102 g. of the product of Example 2 and 6 g. of xylene by a similar process to that in Example 17, except that methanol was collected at a cooking temperature of 193–218° C. over a period of 9½ hours. Thereafter 75 g. of xylene was added. The resultant material had a viscosity (Gardner-Holdt) of E–F. 25 g. of rutile $TiO_2$ was then ground on a roller mill into 100 g. of this product. When this enamel was applied to a metal panel and baked ½ hour at 500° F., a hard flexible white film resulted which withstood prolonged heating at 500° F. with good color and gloss retention.

This application is a continuation-in-part of my copending application Serial No. 113,675 identified hereinabove. The silicones of that application are certain selected polysiloxanes which have been modified with hydroxyl groups, while the silicones of the present invention are substantially identical except that instead of hydroxyl groups they have been modified with RO— groups where R is as defined hereinabove. Thus, both applications involve comparable, selected polysiloxanes which have been modified with R'O— groups where R' is either hydrogen (as in Serial No. 113,675) or R as defined hereinabove. The alkyd component of the present compositions is substantially identical with the alkyd component of the compositions of my said copending application, as will be apparent when the alkyds are compared.

Having disclosed my invention, what I claim is:

1. A coating composition particularly adapted to deposit baked films capable of enduring prolonged service at elevated temperatures without becoming discolored appreciably, said composition comprising a substantial amount of a film-forming vehicle composed essentially of an aromatic hydrocarbon solvent solution of a cobodied inter-reaction product prepared from reactants consisting of: (A) between 25 and 90 parts by weight of a thermally-evanescent, substantially non-discoloring monocarboxylic-acid-modified alkyd having free hydroxyls and an acid number below about 50, said alkyd being the resinous reaction product of only the following materials: (1) organic acidic material selected from the group consisting of polycarboxylic acids and polycarboxylic acid anhydrides which boil or sublime above about 200° C.; (2) polyhydric alcohol selected from the group consisting of glycerol, pentaerythritol, trimethylol propane and trimethylol ethane; and (3) monocarboxylic acid selected from the group consisting of saturated aliphatic acids having from 6 to 10 carbon atoms, and aryl and aralkyl acids having not more than 11 carbon atoms and free of non-benzenoid unsaturation, said monocarboxylic acid being present in an amount such that the total weight of monocarboxylic acid esters is between about ⅓ and ½ of the total weight of theoretical esters in the alkyd; and (B) between about 75 and 10 parts of polysiloxane modified with RO— groups and characterized (1) by having its silicon atoms bonded together by Si—O—Si linkages, (2) by having the remaining valences of its said silicon atoms satisfied by methyl, phenyl and RO— radicals, where R is a hydrocarbon radical of up to 6 carbons selected from the group consisting of alkyl and cycloalkyl radicals, (3) by having a total of between 1 and 1.7 methyl and phenyl radicals per silicon atom of which total between 10 and 90 percent are phenyl radicals, (4) by having between about 0.01 and 2 RO— groups per silicon atom, and (5) by being soluble in an aromatic hydrocarbon solvent; said film-forming vehicle being produced by cobodying said alkyd and said polysiloxane in an aromatic hydrocarbon solvent under reflux conditions with separation of liberated reaction products contained in the vapor phase and return of the hydrocarbon solvent until a substantial increase in viscosity short of gellation has been secured in the mass being refluxed, said free hydroxyls of said monocarboxylic-acid-modified alkyd being present in sufficient quantity to react with at least a major part of the RO— groups of the polysiloxane to liberate alcohols corresponding to the reacted RO— groups.

2. A coating composition as claimed in claim 1 wherein said vehicle is essentially a xylene solution of said inter-reaction product; and wherein said cobodying under reflux conditions is carried out in xylene.

3. A coating composition as claimed in claim 1 wherein said vehicle is pigmented with heat-stable pigments.

4. A coating composition as claimed in claim 3 wherein the vehicle/pigment ratio yields an enamel.

5. A coating composition as claimed in claim 1 wherein the said polysiloxane amounts to between about 20 and 60 parts.

6. A coating composition as claimed in claim 5 wherein the free hydroxyl content of the alkyd is sufficient to react with all of the RO —groups of the said polysiloxane.

7. A composition as claimed in claim 6 wherein the RO— groups amount to between about 0.1 and 1 per silicon atom in the polysiloxane.

References Cited in the file of this patent

UNITED STATES PATENTS

| | | |
|---|---|---|
| 2,584,340 | Goodwin et al. | Feb. 5, 1952 |
| 2,584,341 | Goodwin et al. | Feb. 5, 1952 |
| 2,587,295 | Doyle et al. | Feb. 26, 1952 |
| 2,589,243 | Goodwin et al. | Mar. 18, 1952 |
| 2,605,243 | Sowa | July 29, 1952 |
| 2,663,694 | Millar | Dec. 22, 1953 |